United States Patent
Tsutsumi et al.

(10) Patent No.: US 8,601,817 B2
(45) Date of Patent: Dec. 10, 2013

(54) HYDROGEN PRODUCTION APPARATUS AND POWER GENERATION PLANT

(75) Inventors: Takanori Tsutsumi, Tokyo (JP); Yoshinori Koyama, Tokyo (JP); Katsuhiro Ota, Tokyo (JP); Takashi Fujii, Tokyo (JP); Hiromi Ishii, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/389,683

(22) PCT Filed: Dec. 9, 2010

(86) PCT No.: PCT/JP2010/072160
§ 371 (c)(1),
(2), (4) Date: Feb. 9, 2012

(87) PCT Pub. No.: WO2011/071122
PCT Pub. Date: Jun. 16, 2011

(65) Prior Publication Data
US 2012/0137689 A1    Jun. 7, 2012

(30) Foreign Application Priority Data

Dec. 10, 2009    (JP) .................................. 2009-280786

(51) Int. Cl.
| | | |
|---|---|---|
| F01K 27/00 | (2006.01) | |
| F01K 25/00 | (2006.01) | |
| B01J 10/00 | (2006.01) | |
| B01J 8/00 | (2006.01) | |
| B01J 19/00 | (2006.01) | |

(52) U.S. Cl.
USPC ............. 60/671; 422/129; 422/198; 422/187; 60/643

(58) Field of Classification Search
USPC ............ 60/643, 645, 653, 673, 670; 422/600, 422/625–631, 211; 48/61, 197 R; 423/246, 423/247, 655, 656
See application file for complete search history.

(56) References Cited

U.S. PATENT DOCUMENTS

| 4,062,673 A | 12/1977 | Roberts | |
|---|---|---|---|
| 4,476,683 A * | 10/1984 | Shah et al. | 60/648 |

(Continued)

FOREIGN PATENT DOCUMENTS

| CN | 101023023 | 8/2007 |
|---|---|---|
| EP | 0 321 739 | 6/1989 |

(Continued)

OTHER PUBLICATIONS

International Search Report issued Mar. 8, 2011 in corresponding International Application No. PCT/JP2010/072160.

(Continued)

*Primary Examiner* — Thomas E. Denion
*Assistant Examiner* — Laert Dounis
(74) *Attorney, Agent, or Firm* — Wenderoth, Lind & Ponack, LLP

(57) ABSTRACT

A hydrogen production apparatus which includes: a humidifier (2), which is supplied with a process fluid containing carbon monoxide and mixes the process fluid with steam; a reactor (3), which reacts the humidified process fluid output from the humidifier in the presence of a catalyst, thereby converting the carbon monoxide within the process fluid into carbon dioxide; a first pipe (A) through which high-temperature process fluid flows following reaction in the reactor; a second pipe (B) that supplies makeup water; at least one first heat exchanger (51a, 51b) disposed at one of one or more locations where the first pipe and the second pipe cross each other; and a third pipe (C) that supplies steam generated by heat exchange in the first heat exchanger to other apparatus.

4 Claims, 9 Drawing Sheets

(56) References Cited

U.S. PATENT DOCUMENTS

| | | | |
|---|---|---|---|
| 4,946,477 A | 8/1990 | Perka et al. | |
| 5,345,756 A | 9/1994 | Jahnke et al. | |
| 5,358,696 A | 10/1994 | Jahnke | |
| 6,863,879 B2 * | 3/2005 | Rojey et al. | 423/651 |
| 2002/0004533 A1 * | 1/2002 | Wallace et al. | 518/712 |
| 2006/0236697 A1 | 10/2006 | Rao et al. | |
| 2007/0137107 A1 | 6/2007 | Barnicki | |

FOREIGN PATENT DOCUMENTS

| | | |
|---|---|---|
| GB | 1 325 172 | 8/1973 |
| GB | 2 022 074 | 12/1979 |
| JP | 63-32111 | 2/1988 |
| JP | 1-301925 | 12/1989 |
| JP | 9-502694 | 3/1997 |
| JP | 2000-511253 | 8/2000 |
| JP | 2006-513128 | 4/2006 |
| JP | 2009-519891 | 5/2009 |
| WO | 95/11379 | 4/1995 |
| WO | 95/15290 | 6/1995 |
| WO | 03/080503 | 10/2003 |
| WO | 2004/062764 | 7/2004 |
| WO | 2007/073454 | 6/2007 |
| WO | 2010/067836 | 6/2010 |

OTHER PUBLICATIONS

Extended European Search Report issued May 17, 2013 in European patent application No. 10836042.1.

Office Action issued Jul. 11, 2013 in corresponding Chinese Application No. 201080037207.6 (with English translation).

* cited by examiner

HYDROGEN PRODUCTION APPARATUS AND POWER GENERATION PLANT

BACKGROUND OF THE INVENTION

1. Technical Field

The present invention relates to a hydrogen production apparatus and a power generation plant that convert carbon monoxide contained within a gas from an upstream apparatus that uses coal, natural gas or oil or the like into hydrogen.

2. Description of the Related Art

In a $CO_2$ capture-type integrated gasification combined cycle (IGCC), a coal gas produced by gasification in a gasifier is supplied to a hydrogen production apparatus. In this hydrogen production apparatus, the coal gas and steam are reacted in the presence of a catalyst, thereby converting the carbon monoxide contained within the coal gas into carbon dioxide, and producing a hydrogen-rich coal gas. Following this shift reaction, the coal gas is desulfurized in a desulfurizer, and is then fed into a carbon dioxide capture apparatus to capture the carbon dioxide within the gas, and the resulting hydrogen-enrich purified gas is supplied to a combined power generation facility. In the combined power generation facility, for example, the purified gas is fed into the combustor of a gas turbine and used as the motive power for driving the gas turbine, while steam that has been heated by heat exchange with the exhaust heat from the gas turbine is used for driving a steam turbine.

Related Patent Document: Japanese Translation of PCT International Application, Publication No. Hei 09-502694

SUMMARY OF THE INVENTION

1. Technical Problem

In the desulfurizer mentioned above, a heat source is required when performing the desulfurization. Conventionally, the steam used for driving the steam turbine in the combined power generation facility is supplied as this heat source.

However, if the heat source for the desulfurizer is supplied entirely from the steam used for driving the steam turbine, then the amount of steam available for driving the steam turbine decreases accordingly, resulting in a reduction in the output from the steam turbine, and a reduction in the power output (power generation efficiency) of the overall IGCC.

The present invention has been developed to address the above problems, and has an object of providing a hydrogen production apparatus and a power generation plant that can improve the power generation efficiency.

2. Solution to the Problem

In order to achieve the above object, the present invention adopts the aspects described below.

A first aspect of the present invention provides a hydrogen production apparatus (hydrogen production system), which is provided in a power generation plant comprising a boiler and a steam turbine that is driven by a high-temperature steam produced in the boiler, and which produces steam for supply to other apparatus within the power generation plant. The hydrogen production apparatus comprises a humidifier, which is supplied with a process fluid containing carbon monoxide and mixes the process fluid with a steam, a reactor, which reacts the humidified process fluid output from the humidifier in the presence of a catalyst, thereby converting the carbon monoxide within the process fluid into carbon dioxide, a first pipe through which the high-temperature process fluid flows following reaction in the reactor, a second pipe that supplies makeup water, at least one first heat exchanger, each of which is disposed at one of one or more locations where the first pipe and the second pipe cross each other, and a third pipe that supplies a steam generated by heat exchange in the first heat exchanger to the above-mentioned other apparatus.

According to the hydrogen production apparatus of the first aspect described above, the process fluid that has been mixed with steam in the humidifier is fed into the reactor. By reacting the process fluid in the reactor in the presence of a catalyst, the carbon monoxide contained within the process fluid is converted to carbon dioxide, and as a result of this reaction, the amount of hydrogen within the process fluid increases. Further, reaction heat is also generated during the reaction. The hydrogen-rich process fluid, which has been heated to a high temperature by the reaction, is output through the first pipe. Meanwhile, makeup water is supplied through the second pipe. The first pipe and the second pipe cross each other at one or more locations, and a heat exchanger is disposed at each of these crossing locations. In this heat exchanger, the makeup water flowing through the second pipe undergoes heat exchange with the high-temperature process fluid output from the reactor, causing an increase in the temperature of the makeup water and the generation of steam, and this steam passes through the third pipe and is supplied to other apparatus within the power generation plant.

In this manner, in the hydrogen production apparatus according to this aspect, the reaction heat within the reactor is used to generate steam, and this steam is then supplied to other apparatus, and therefore, for example, the use within other apparatus of a portion of the high-temperature steam used for driving the steam turbine can be prevented, or the amount of steam used can be reduced. As a result, the amount of high-temperature steam supplied to the steam turbine can be increased, enabling the power generation efficiency to be improved.

The hydrogen production apparatus according to the first aspect described above may have a structure that further comprises a discharge passage through which a portion of the excess moisture within the humidifier is released externally, a second heat exchanger provided at a location where the second pipe and the discharge passage cross each other, and a gas-liquid separator that is supplied with the makeup water that has completed heat exchange within the first heat exchanger and the second heat exchanger, wherein the above-mentioned third pipe is connected to the gas phase portion of the gas-liquid separator, and the steam separated by the gas-liquid separator is supplied to the above-mentioned other apparatus.

In the structure described above, because the second heat exchanger is provided at a location where the second pipe crosses the discharge passage through which a portion of the excess moisture within the humidifier is released externally, the heat produced within the apparatus can be used even more efficiently to produce steam. As a result, more steam can be supplied to the other apparatus.

The hydrogen production apparatus according to the first aspect described above may have a structure that further comprises a fourth pipe that circulates drain water from the liquid phase portion of the gas-liquid separator. The fourth pipe is connected to the second pipe.

In this structure, the makeup water can be circulated, enabling the amount of makeup water supplied to be reduced.

The hydrogen production apparatus according to the first aspect described above can be applied widely within power generation plants which require apparatus that utilize the type of reaction in which, for example, carbon monoxide is removed from a gas containing hydrocarbon compounds. The apparatus is particularly suitable as the hydrogen production apparatus within a $CO_2$ capture-type IGCC.

A second aspect of the present invention provides a power generation plant comprising a gasifier that gasifies a coal and produces a coal gas, any of the hydrogen production apparatus described above, which is supplied with the coal gas from the gasifier and produces a hydrogen-rich coal gas, a purified gas production apparatus that removes hydrogen sulfide and carbon dioxide from the hydrogen-rich coal gas output from the hydrogen production apparatus and produces a purified gas, a combined power generation facility comprising a gas turbine and a steam turbine, and a purified gas pipe that supplies the purified gas produced by the purified gas production apparatus to the combined power generation facility. The purified gas pipe crosses the first pipe of the hydrogen production apparatus at one or more locations, a heat exchanger is disposed at each crossing location, and the purified gas, having undergone at least one heat exchange with the high-temperature process fluid flowing through the first pipe, is supplied to the combined power generation facility through the purified gas pipe.

According to the power generation plant of the second aspect described above, the reaction heat within the reactor can be used to raise the temperature of the purified gas, and this heated purified gas is then supplied to the combined power generation facility. As a result, the reaction heat within the reactor can be used more efficiently, which can contribute to an improvement in the efficiency of the power generation plant.

Further, the hydrogen production apparatus according to the first aspect described above may have a structure (a third aspect) that further comprises a fifth pipe that supplies the process fluid that has been humidified in the humidifier from the humidifier to the reactor, a circulation passage that circulates excess moisture from within the humidifier, and a fourth heat exchanger, which is provided at a location where the circulation passage and the first pipe cross each other, and effects heat exchange between the high-temperature process fluid produced following reaction in the reactor and the fluid circulating through the circulation passage.

In the structure according to the third aspect described above, the process fluid that has been mixed with steam in the humidifier is fed into the reactor through the fifth pipe. By reacting the process fluid inside the reactor in the presence of a catalyst, the carbon monoxide within the process fluid is converted into carbon dioxide, and this reaction increases the amount of hydrogen contained within the process fluid. Further, reaction heat is also generated during the reaction. The hydrogen-rich process fluid, which has been heated to a high temperature by the reaction, is output through the first pipe.

Meanwhile, excess steam within the humidifier that has not been mixed with the process fluid is, for example, cooled to produce water and then returned to the humidifier via the circulation passage.

In this case, because the fourth heat exchanger, which effects heat exchange between the high-temperature process fluid and the fluid circulating through the circulation passage, is provided at a location where the circulation passage and the first pipe cross each other, the fluid circulating through the circulation passage is heated by the heat of the process fluid, and is converted to a high-temperature fluid which is subsequently returned to the humidifier. In this manner, the above structure circulates excess steam (water) from the humidifier and heats this steam (water) to a high temperature using the reaction heat from the reactor, and therefore the steam used in the humidifier can be supplied from within the same hydrogen production apparatus. As a result, the amount of steam that must be supplied from other apparatus can be reduced significantly.

The hydrogen production apparatus according to the third aspect described above may have a structure that further comprises a first bypass pipe that branches from the circulation passage and bypasses the fourth heat exchanger, and a first flow control valve, which is provided within the first bypass pipe and controls the flow rate of the fluid supplied to the first heat exchanger.

According to the structure described above, because the first bypass pipe that bypasses the fourth heat exchanger is provided within the circulation passage, a portion of the fluid supplied to the fourth heat exchanger can bypass the heat exchanger. Moreover, because the first flow control valve is provided within the first bypass pipe, the flow rate of the fluid being supplied to the fourth heat exchanger can be adjusted to an appropriate value by adjusting the first flow control valve to an appropriate degree of opening. As a result, the temperature of the fluid can be adjusted to an appropriate temperature, and the temperature of the fluid returned to the humidifier can be adjusted to an appropriate temperature.

The hydrogen production apparatus according to the third aspect described above may have a structure that further comprises a fifth heat exchanger, which is provided at a location where the fifth pipe and the first pipe cross each other, and effects heat exchange between the process fluid from the humidifier and the post-reaction high-temperature process fluid output from the reactor.

According to the structure described above, by performing heat exchange in the fifth heat exchanger between the process fluid supplied from the humidifier to the reactor, and the high-temperature process fluid output from the reactor, the temperature of the process fluid supplied to the reactor can be increased, bringing the temperature closer to the ideal temperature conditions for the reaction.

The hydrogen production apparatus according to the third aspect described above may have a structure that further comprises a second bypass pipe that branches off the first pipe and bypasses the fifth heat exchanger, and a second flow control valve, which is provided within the second bypass pipe and controls the flow rate of the above-mentioned post-reaction high-temperature process fluid supplied to the fifth heat exchanger.

According to the structure described above, by adjusting the second flow control valve provided within the second bypass pipe to achieve an appropriate degree of opening, the flow rate of the high-temperature process fluid supplied to the fifth heat exchanger can be adjusted to an appropriate level. As a result, the degree of heat exchange within the fifth heat exchanger can be regulated, and the temperature of the process fluid supplied to the reactor can be adjusted to a temperature that is appropriate for the reaction.

The hydrogen production apparatus according to the third aspect described above may have a structure that further comprises a sixth pipe that supplies makeup water to the humidifier, and a heat exchanger which is provided at a location where the sixth pipe and the first pipe cross each other, and effects heat exchange between the post-reaction high-temperature process fluid and the makeup water flowing through the sixth pipe.

According to the structure described above, the makeup water that flows through the sixth pipe is supplied to the humidifier after being heated by heat exchange with the high-temperature process fluid in the heat exchanger provided within the sixth pipe. As a result, the humidifier can be replenished with makeup water (steam) at a temperature that is appropriate for the temperature conditions inside the humidifier, enabling the amount of steam inside the humidifier to be maintained at an appropriate level.

In the hydrogen production apparatus according to the third aspect described above, the sixth pipe and the first pipe may cross each other at a plurality of locations, and a heat exchanger may be disposed at each of these crossing locations.

In this manner, by crossing the sixth pipe and the first pipe at a plurality of locations, and providing a heat exchanger at each of these crossing locations, the temperature of the makeup water that flows through the sixth pipe can be increased gradually, enabling some or all of the makeup water to be converted to steam.

The hydrogen production apparatus according to the third aspect described above may have a structure that further comprises a gas-liquid separator which is provided within the sixth pipe and separates the fluid flowing through the sixth pipe into water and steam, and a seventh pipe that supplies the steam separated by the gas-liquid separator to the fifth pipe.

According to the structure described above, the makeup water that flows through the sixth pipe is separated into water and steam by the gas-liquid separator, and the separated steam flows through the seventh pipe and is supplied to the fifth pipe. As a result, additional steam can be added to the process fluid flowing through the fifth pipe.

The hydrogen production apparatus according to the third aspect described above may have a structure that further comprises a fourth flow control valve, which is provided within the seventh pipe and controls the flow rate of the steam supplied to the fifth pipe.

This enables the amount of steam supplied to the fifth pipe to be adjusted to an appropriate level.

The hydrogen production apparatus according to the third aspect described above may have a structure that further comprises a sixth heat exchanger, which is provided within the seventh pipe and heats the steam that flows through the seventh pipe with the heat generated in the reactor.

According to the structure described above, the temperature of the steam flowing through the seventh pipe can be increased prior to mixing with the contents of the fifth pipe. Further, because the steam flowing through the seventh pipe removes some of the reaction heat from the reactor, the temperature of the reactor can be reduced, and the reaction can be accelerated.

The hydrogen production apparatus according to the third aspect described above may have a structure that further comprises an eighth pipe which branches from the seventh pipe and supplies a portion of the steam flowing through the seventh pipe to the humidifier.

According to this structure, steam can also be supplied to the humidifier from the seventh pipe.

The hydrogen production apparatus according to the third aspect described above may have a structure that further comprises a fifth flow control valve, which is provided within the eighth pipe and controls the amount of steam supplied to the humidifier.

By including the fifth control valve, the amount of steam supplied to the humidifier from the seventh pipe can be controlled.

The hydrogen production apparatus according to the third aspect described above may have a structure in which the degree of opening of the first flow control valve and the degree of opening of the fifth flow control valve are controlled on the basis of the atmospheric temperature inside the humidifier.

The atmospheric temperature inside the humidifier is preferably maintained at a temperature that is appropriate for mixing steam with the process fluid. As the opening degree of the first flow control valve approaches a fully closed state, the amount of fluid entering the fourth heat exchanger increases and the temperature of the fluid can be increased, and by supplying this fluid to the humidifier, the temperature inside the humidifier can be increased. Further, as the opening degree of the fifth flow control valve approaches a fully open state, the amount of steam supplied to the humidifier via the seventh pipe can be increased. The steam flowing through the seventh pipe has been converted to a high-temperature state by the reaction heat from the reactor, and therefore by supplying this high-temperature steam to the humidifier, the temperature of the humidifier can be increased.

In this manner, the atmospheric temperature inside the humidifier can be maintained at an appropriate value by controlling the opening degrees of the first flow control valve and the fifth flow control valve.

The hydrogen production apparatus according to the third aspect described above may have a structure wherein in those cases where the temperature inside the humidifier does not reach saturation temperature even when the first flow control valve is placed in a fully closed state with the fifth flow control valve in a fully closed state, the aperture of the fifth flow control valve is opened until the temperature inside the humidifier reaches saturation temperature.

Increasing the temperature of the fluid circulating within the circulation passage is given priority, and in those cases where the atmospheric temperature inside the humidifier does not reach saturation temperature even with the supply of steam from the circulation passage, the fifth flow control valve can be gradually opened to supply high-temperature steam to the humidifier from the seventh pipe. By specifying an order of priority in this manner, the amount of steam supplied through the seventh pipe can be suppressed to an absolute minimum. This enables the problem of a reduction in the amount of steam supplied via the seventh pipe to be avoided.

The hydrogen production apparatus according to the third aspect described above may have a structure that further comprises a discharge passage, which branches from the circulation passage and through which a portion of the fluid flowing through the circulation passage is released externally.

As the fluid is circulated through the circulation passage and reused many times, the amount of impurities contained within the fluid gradually increases. In this case, by providing the above discharge passage, the contaminated fluid can be discharged and the amount of impurities contained within the fluid can be reduced.

3. Advantageous Effects of the Invention

The present invention has the effect of enabling an improvement in the power generation efficiency.

DETAILED DESCRIPTION OF THE INVENTION

First Embodiment

A hydrogen production apparatus and a power generation plant according to a first embodiment of the present invention are described below, with reference to the drawings.

Figure 1:
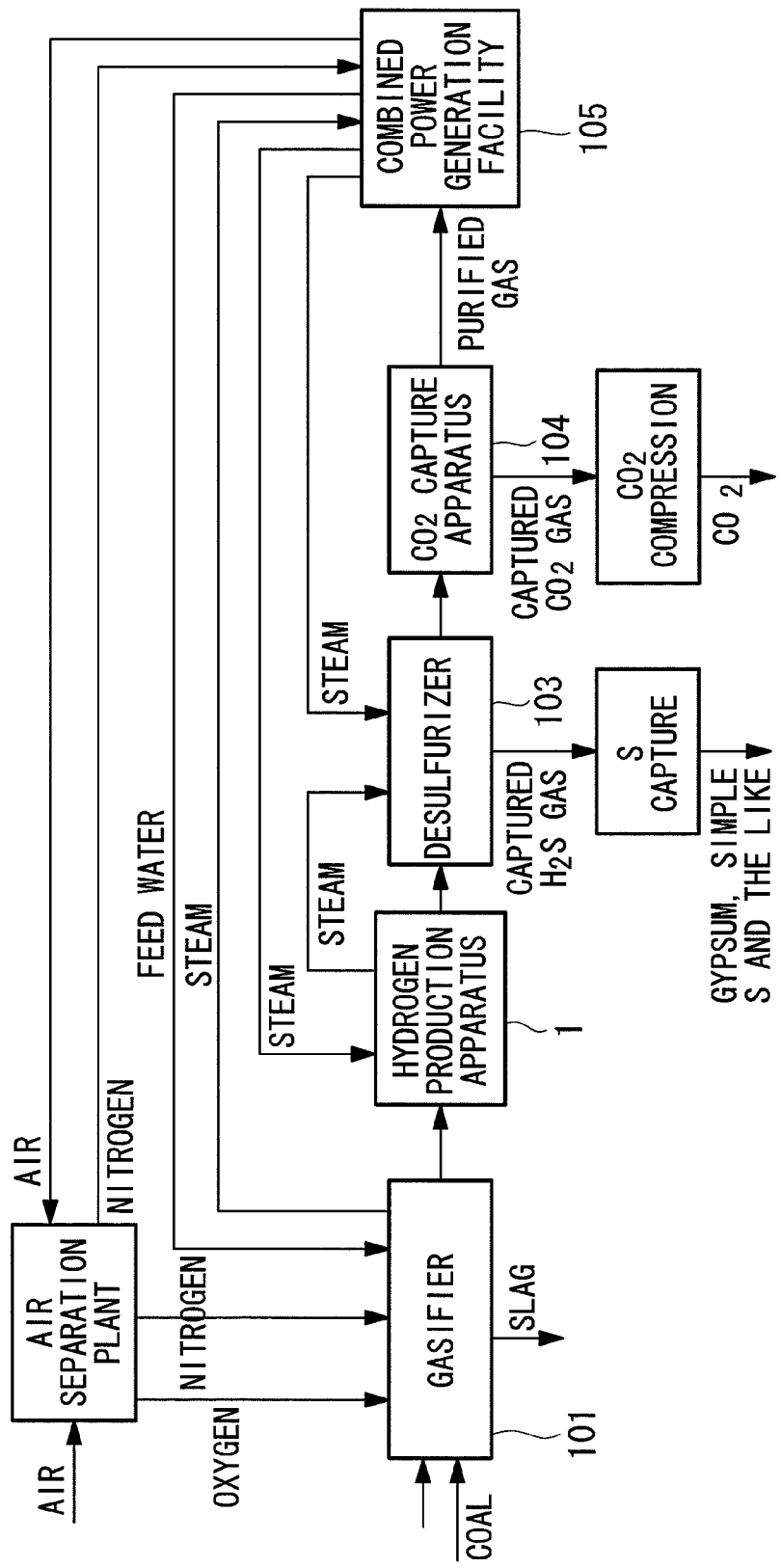
FIG. 1 A schematic structural diagram illustrating the main components of a power generation plant according to a first embodiment of the present invention.

FIG. 1 is a schematic structural diagram illustrating the main components of a power generation plant according to this embodiment. As illustrated in FIG. 1, the power generation plant according to the present embodiment is a $CO_2$ capture-type IGCC (Integrated Gasification Combined Cycle), and comprises a gasifier 101, a hydrogen production apparatus 1, a desulfurizer 103, a carbon dioxide capture apparatus 104, and a combined power generation facility 105. In this type of power generation plant, a coal gas that has been gasified in the gasifier 101 is fed into the hydrogen production apparatus 1, and in the hydrogen production apparatus 1, the coal gas is reacted with steam in the presence of a catalyst, thereby converting the carbon monoxide contained in the coal gas into carbon dioxide, and producing a hydrogen-rich coal gas. Following the shift reaction, the coal gas is desulfurized in the desulfurizer 103, and is then supplied to the carbon dioxide capture apparatus 104, where the carbon dioxide within the gas is captured. The resulting hydrogen-enriched purified gas is then supplied to the combined power generation facility 105. In the combined power generation facility 105, the purified gas is, for example, fed into the combustor of a gas turbine and used as the motive power for driving the gas turbine, while a high-temperature steam produced by the exhaust heat from the gas turbine is used for driving a steam turbine, thereby generating electric power.

Steam from the combined power generation facility 105 is supplied as a heat source to the gasifier 101, the hydrogen production apparatus 1 and the desulfurizer 103 that constitute this type of power generation plant. Further, as described below, steam is also produced in the hydrogen production apparatus 1, and this steam is supplied to the desulfurizer 103.

Conventionally, high-temperature steam has been supplied from the combined power generation facility 105 to all those apparatus within the plant that require steam as a heat source, but in this embodiment, by producing steam in the hydrogen production apparatus 1 and supplying this steam to other apparatus, the steam supply from the combined power generation facility 105 can be supplemented. Accordingly, the amount of steam discharged from the combined power generation facility 105 to other apparatus can be reduced, and the high-temperature equipment within the combined power generation facility 105 can be used, as far as possible, for rotationally driving the steam turbine. As a result, the power generation efficiency can be improved.

FIG. 1 illustrates the case where steam is supplied from the hydrogen production apparatus 1 to the desulfurizer 103, but the destination for the steam supplied from the hydrogen production apparatus 1 is not limited to the desulfurizer 103, and may be any other apparatus within the power generation plant that requires high-temperature steam as a heat source.

Figure 2:
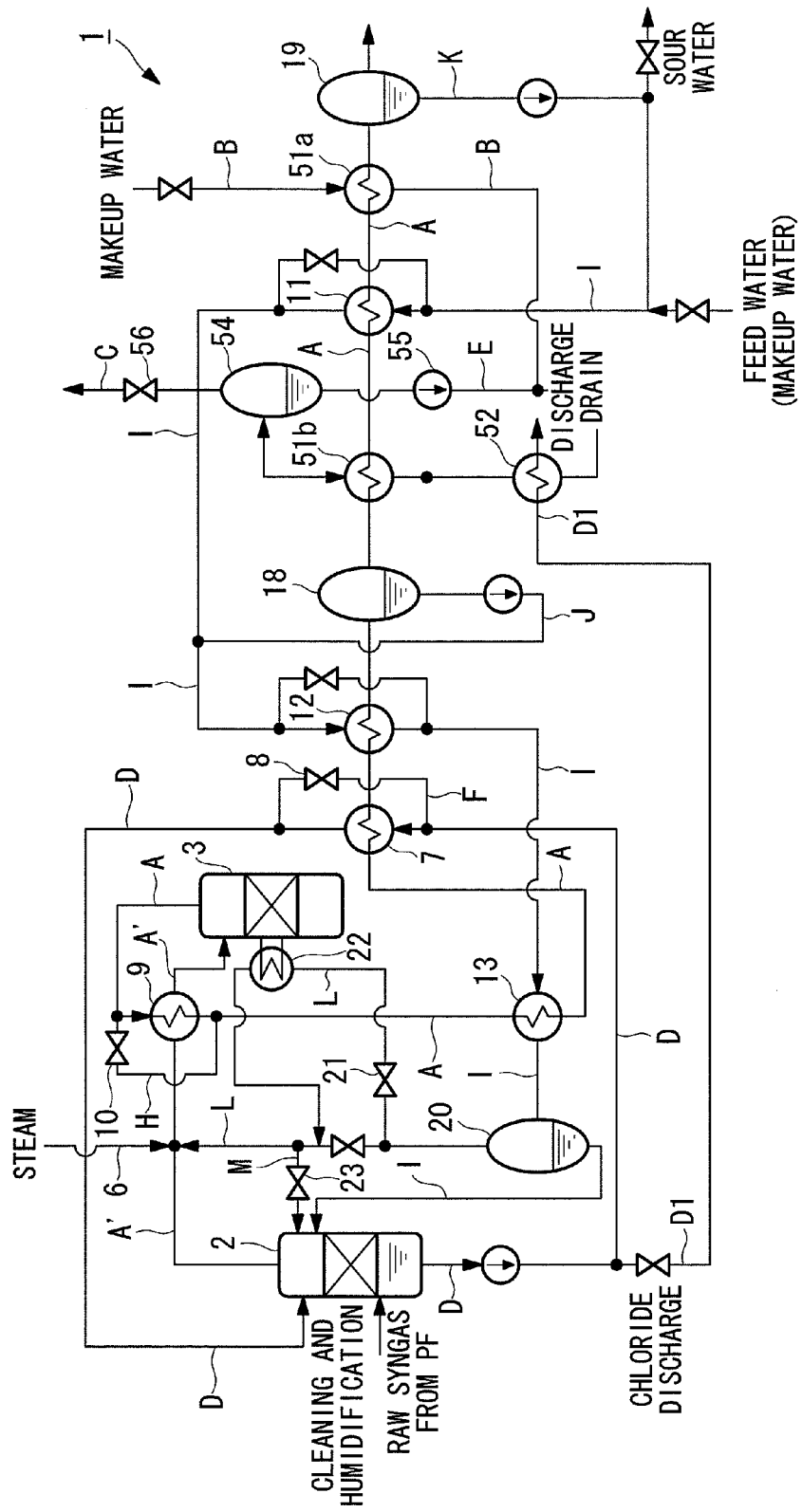
FIG. 2 A diagram schematically illustrating the structure of a hydrogen production apparatus according to the first embodiment of the present invention.

FIG. 2 is a diagram schematically illustrating the structure of the hydrogen production apparatus 1 according to the present embodiment. In order to improve the power generation efficiency within the combined power generation facility 105, the hydrogen production apparatus 1 according to the present embodiment comprises (I) structures for producing steam for supply to other apparatus, and (II) structures that enable efficient utilization of heat sources within the hydrogen production apparatus, thereby reducing, as far as possible, heat sources that must be supplied from externally (from the combined power generation facility 105 in the present embodiment) (hereinafter these structures are referred to as "structures for improving efficiency within the apparatus").

The structures (I) and their effects are described below, followed by a description of the structures (II) and their effects.

(I) Structures for Producing Steam for Supply to Other Apparatus

As illustrated in FIG. 2, the hydrogen production apparatus 1 according to the present embodiment comprises a humidifier 2 which is supplied with a process fluid containing carbon monoxide and mixes the process fluid with a steam, and a reactor 3, which reacts the humidified process fluid output from the humidifier 2 in the presence of a catalyst, thereby converting the carbon monoxide within the process fluid into carbon dioxide. Following reaction in the reactor 3, the high-temperature process fluid flows through a first pipe A and is supplied to the desulfurizer 103 illustrated in FIG. 1.

Further, a second pipe B is provided for supplying a makeup water from an external apparatus, and a plurality of first heat exchangers 51a and 51b that effect heat exchange between the high-temperature process fluid flowing through the first pipe A and the low-temperature makeup water flowing through the second pipe B are provided at locations where the first pipe A and the second pipe B cross each other.

The humidifier 2 is provided with a circulation passage D that circulates the drain water that represents the excess moisture that was not mixed with the process fluid. This circulation passage D is provided with a discharge passage D1, which branches from the circulation passage D and through which a portion of the drain water flowing through the circulation passage D is released externally. This discharge passage D1 is provided with a control valve for controlling the amount of drain water that is discharged externally. The drain water flowing through the discharge passage D1 has been heated, for example, to a temperature of approximately 200° C. A second heat exchanger 52 is provided within the discharge passage D1, at a location where the discharge passage D1 crosses the second pipe B.

FIG. 2 illustrates a structure in which the first heat exchanger 51a, the second heat exchanger 52 and the first heat exchanger 51b are provided in sequence within the second pipe B, with the first heat exchanger 51a positioned farthest upstream, but there are no particular limitations on the sequence in which these heat exchangers are provided.

Following heat exchange in the first heat exchangers 51a and 51b and the second heat exchanger 52, the makeup water is fed into a gas-liquid separator 54, and a gas-liquid separation is performed. The steam separated in the gas-liquid separator 54 is supplied to the desulfurizer 103 (see FIG. 1) through a third pipe C connected to the gas phase portion of the gas-liquid separator 54. A pressure control valve 56 is provided within the third pipe C, and the pressure of the discharged steam is controlled by adjusting the degree of opening of this pressure control valve 56.

Furthermore, the liquid phase portion of the gas-liquid separator 54 is connected to a fourth pipe E. This fourth pipe E is connected to the second pipe B. In FIG. 2, the fourth pipe E is connected to the second pipe B at a location between the first heat exchanger 51a and the second heat exchanger 52. Accordingly, the drain water separated by the gas-liquid separator 54 passes through the fourth pipe E and merges with the makeup water flowing through the second pipe B, thus forming a circulation passage for the makeup water. Furthermore, a circulating pump 55 is provided within the fourth pipe E, and the circulation volume is controlled by this circulating pump 55.

In this type of hydrogen production apparatus 1, a process fluid comprising carbon monoxide is supplied to the humidifier 2, and is mixed with steam and heated to saturation temperature inside the humidifier 2. Having been mixed with steam inside the humidifier 2, the process fluid is fed into the reactor 3. In the reactor 3, the process fluid is reacted in the presence of a catalyst, thereby converting the carbon monoxide within the process fluid into carbon dioxide. This reaction also causes an increase in the amount of hydrogen contained within the process fluid. Further, reaction heat is also generated during the reaction. The reaction equation is represented by formula (I) shown below.

{Formula 1}

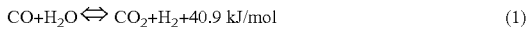

$$CO + H_2O \Leftrightarrow CO_2 + H_2 + 40.9 \text{ kJ/mol} \quad (1)$$

As a result of this reaction, a hydrogen-enriched high-temperature process fluid is output through the first pipe A, is subsequently reduced in temperature by undergoing a plurality of heat exchanges and the like, and is then supplied to the later stage desulfurizer 103.

Meanwhile, makeup water is supplied through the second pipe B from other apparatus that constitute the power generation plant. For example, the makeup water may be supplied from the combined power generation facility 105. More specifically, the combined power generation facility 105 comprises an exhaust heat recovery boiler, which recovers the high-temperature gas following driving of the gas turbine and generates steam by heat exchange with this high-temperature gas, a steam turbine that is rotated by the steam produced in the exhaust heat recovery boiler, a condenser that extracts heat from the exhaust steam that has completed its job of rotating the steam turbine, thereby condensing the steam to form water, a water supply tank for temporarily storing the condensed water and the makeup water, and a deaerator that removes dissolved oxygen within the water supply. The combined power generation facility 105 has a structure wherein the water from which dissolved oxygen has been removed by the deaerator is re-supplied to the exhaust heat recovery boiler and reused. In this type of combined power generation facility 105, the water that has been purified by the deaerator (at a temperature of approximately not less than 40° C. and not more than 120° C.) is supplied to the second pipe B of the hydrogen production apparatus 1.

The makeup water supplied to the apparatus from the second pipe B is supplied to the first heat exchanger 51a via the second pipe B. The makeup water that enters the first heat exchanger 51a is heated by heat exchange with the high-temperature process fluid (for example, approximately 140° C.) flowing through the first pipe A, and the heated makeup water then merges with the drain water flowing through the fourth pipe E and is fed into the second heat exchanger 52. This mixed water that is supplied to the second heat exchanger 52 undergoes heat exchange with the high-temperature discharge water (approximately 200° C.) flowing through the discharge passage D1, and is subsequently heated further in the first heat exchanger 51b by undergoing further heat exchange with the high-temperature process fluid flowing through the first pipe A. By performing heat exchange a plurality of times in this manner, the makeup water is gasified and then fed into the gas-liquid separator 54. In the gas-liquid separator 54, the moisture incorporated within the steam is separated, and the dried high-temperature steam is supplied to the desulfurizer 103 through the third pipe C where it is used as a heat source within the desulfurizer 103. Meanwhile, the water separated from the steam in the gas-liquid separator 54 flows through the fourth pipe E, is added to the makeup water flowing through the second pipe B, and is circulated back through the second pipe B.

In this manner, in the hydrogen production apparatus 1 according to the present embodiment, the makeup water supplied from the second pipe B is heated by heat exchange with the high-temperature process fluid produced in the reactor 3, thereby producing a high-temperature steam, and this steam is supplied to other apparatus such as the desulfurizer 103 (see FIG. 1) within the power generation plant. As a result, the amount of high-temperature steam that must be supplied from the combined power generation facility 105 (see FIG. 1) to the desulfurizer 103 can be reduced, enabling the power generation efficiency to be improved.

(II) Structures for Improving Efficiency within the Apparatus

As illustrated in FIG. 2, a fourth heat exchanger 7 that performs heat exchange between the high-temperature process fluid that has undergone reaction in the reactor 3 and the fluid circulating through the circulation passage D is provided at a location where the circulation passage D and the first pipe A cross each other. A first bypass pipe F that branches from the circulation passage D and bypasses the fourth heat exchanger 7 is provided within the circulation passage D at a position upstream from the fourth heat exchanger 7. A first flow control valve 8 that controls the flow rate of the fluid supplied to the fourth heat exchanger 7 is provided within the first bypass pipe F.

A fifth heat exchanger 9 that performs heat exchange between the process fluid from the humidifier 2 and the post-reaction high-temperature process fluid output from the reactor 3 is provided at a location where the first pipe A crosses a fifth pipe A' that supplies the humidified process fluid from the humidifier 2 to the reactor 3.

A second bypass pipe H that branches from the first pipe A and bypasses the fifth heat exchanger 9 is provided within the first pipe A at a position upstream from the fifth heat exchanger 9. A second flow control valve 10 that controls the flow rate of the post-reaction high-temperature process fluid supplied to the fifth heat exchanger 9 is provided within the second bypass pipe H.

Furthermore, the hydrogen production apparatus 1 is provided with a sixth pipe I for replenishing the makeup water circulating within the apparatus, specifically the moisture used in the humidifier 2. This sixth pipe I is formed so as to cross the first pipe A at least one location, and preferably at a plurality of locations. FIG. 2 illustrates a structure in which crossing occurs at three locations. Heat exchangers 11, 12 and 13 for performing heat exchange between the post-reaction high-temperature process fluid flowing through the first pipe A and the makeup water are provided at each of these crossing locations.

Further, the process fluid flowing through the first pipe A is cooled by heat exchange with the fluid flowing through the circulation passage D and the makeup water flowing through the sixth pipe I, thereby converting the steam within the process fluid into water and generating moisture. In order to recover this moisture contained within the process fluid, at least one gas-liquid separator is provided within the first pipe A. FIG. 2 illustrates the case in which two gas-liquid separators 18 and 19 are provided. The moisture recovered in each of the gas-liquid separators 18 and 19 is supplied, via pipes J and K respectively, to the sixth pipe I that circulates the makeup water.

A gas-liquid separator 20 that separates the fluid flowing through the sixth pipe I into a gas phase and a liquid phase is provided within the sixth pipe I at a location downstream from the most downstream heat exchanger 13 for the makeup water. Further, a seventh pipe L that supplies the steam separated by the gas-liquid separator 20 to the fifth pipe A' is connected to the gas phase portion of the gas-liquid separator 20.

A fourth flow control valve 21 for controlling the flow rate of the steam supplied to the fifth pipe A' is provided within the seventh pipe L. Moreover, a sixth heat exchanger 22 that heats the steam flowing through the seventh pipe L using the heat generated in the reactor 3 is provided within the seventh pipe L.

Furthermore, a steam supply pipe 6 for supplying high-temperature steam, for example from the combined power generation facility 105 (see FIG. 1), is connected to the fifth pipe A'. This steam supply pipe 6 is used for supplying supplementary steam in those cases where insufficient steam is produced within the apparatus, for example in the case where, as described below, the amount of steam is insufficient even when steam is supplied from the seventh pipe L and the like.

Further, an eighth pipe M, which branches from the seventh pipe L and supplies a portion of the steam flowing through the seventh pipe L to the humidifier 2, is provided within the seventh pipe L. A fifth flow control valve 23 for controlling the amount of steam supplied to the humidifier 2 is provided within this eighth pipe M.

In the type of hydrogen production apparatus described above, the hydrogen-enriched high-temperature process fluid produced by the reaction in the reactor 3 is output through the first pipe A. This high-temperature process fluid discharged through the first pipe A undergoes heat exchange in the fifth heat exchanger 9 with the pre-reaction process fluid flowing through the fifth pipe A'. At this time, the flow rate of the post-reaction process fluid fed into the fifth heat exchanger 9 is controlled by the degree of opening of the second flow control valve 10. By controlling the degree of opening of this second flow control valve 10 in accordance with the temperature of the pre-reaction process fluid flowing through the fifth pipe A', the temperature of the pre-reaction process fluid supplied to the reactor 3 can be adjusted to a temperature that is appropriate for the reaction. In this manner, by optimizing the inlet temperature for the reactor 3, the reaction inside the reactor 3 can be accelerated.

Following heat exchange in the fifth heat exchanger 9, the post-reaction process fluid passes through the first pipe A, undergoes further heat exchange in the heat exchanger 13 with the makeup water flowing through the sixth pipe I, and is then fed into the fourth heat exchanger 7. A drain water produced by cooling the excess steam that has not undergone mixing with the process fluid in the humidifier 2 is passed through the circulation passage D and supplied to the fourth heat exchanger 7. In the fourth heat exchanger 7, a heat exchange is performed between the high-temperature process fluid flowing through the first pipe A and the drain water circulating through the circulation passage D, and the thus obtained high-temperature drain water is returned to the humidifier 2 through the circulation passage D, whereas the process fluid from which heat has been removed by the heat exchange passes through the first pipe A and is supplied to the heat exchanger 12.

At this time, the flow rate of the drain water supplied to the fourth heat exchanger 7 is controlled by adjusting the degree of opening of the first flow control valve 8 provided within the first bypass pipe F. By adjusting the degree of opening of the first flow control valve 8 in accordance with the atmospheric temperature inside the humidifier 2, the temperature of the drain water supplied to the humidifier 2 can be adjusted to a temperature that is appropriate for the atmospheric temperature inside the humidifier 2 (for example, saturation temperature). Accordingly, the atmospheric temperature inside the humidifier 2 can be maintained at the optimal value.

The process fluid fed into the heat exchanger 12 is cooled further by undergoing heat exchange with the makeup water flowing through the sixth pipe I, and is then fed into the gas-liquid separator 18. In the gas-liquid separator 18, the moisture contained within the process fluid is recovered, and this moisture is supplied to the sixth pipe I via a pipe J. Following recovery of the moisture in the gas-liquid separator 18, the process fluid passes through the first heat exchanger 51b and is then supplied to the heat exchanger 11, where it undergoes a second heat exchange with the makeup water. Following this heat exchange, the process fluid passes through the first heat exchanger 51a and is fed into the gas-liquid separator 19, and following recovery of the moisture, is supplied to the desulfurizer 103 (see FIG. 1).

Meanwhile, as described above, the makeup water flowing through the sixth pipe I is gradually heated by heat exchange with the process fluid in the three heat exchangers 11, 12 and 13, and is in a state that includes a portion of steam when it enters the gas-liquid separator 20.

In the gas-liquid separator 20, the steam and water are separated, and the makeup water is supplied to the humidifier 2 through the sixth pipe I. Meanwhile, the steam is passed through the seventh pipe L and is supplied to the sixth heat exchanger 22. In the sixth heat exchanger 22, the steam flowing through the seventh pipe L is heated by the reaction heat from the reactor 3.

Figure 3:
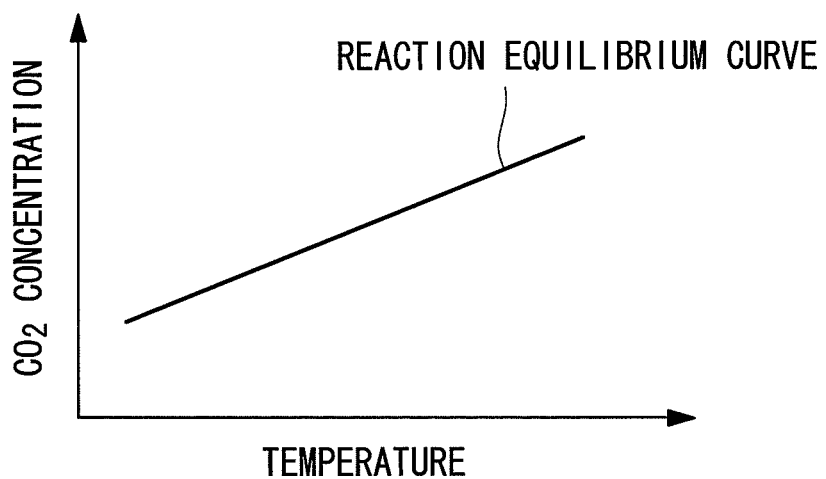
FIG. 3 A diagram illustrating the equilibrium curve for the relationship between the carbon monoxide concentration and the temperature inside the reactor.

As a result, the heat generated during reaction in the reactor 3 can be consumed, and the atmospheric temperature inside the reactor 3 can be suppressed. The carbon monoxide concentration and the temperature inside the reactor 3 exhibit the type of correlation illustrated in FIG. 3. In other words, lower temperatures enable more of the carbon monoxide contained within the process fluid to be converted to carbon dioxide, meaning the amount of carbon monoxide within the process fluid can be reduced. Accordingly, by suppressing any increase in the temperature inside the reactor 3, the reaction in the reactor 3 can be accelerated.

Of the steam flowing through the seventh pipe L, which has been heated to a high temperature using the heat generated during reaction, a portion is supplied to the humidifier 2 via the eighth pipe M, and the remainder is merged with the process fluid flowing through the fifth pipe A'. The flow rate of the steam supplied to the humidifier 2 through the eighth pipe M is controlled by the degree of opening of the fifth flow control valve 23 provided within the eighth pipe M.

The atmospheric temperature inside the humidifier 2 is preferably maintained at a temperature that is appropriate for mixing the process fluid and the steam. As described above, the atmospheric temperature inside the humidifier 2 is controlled by adjusting the degree of opening of the first flow control valve 8 provided within the first bypass pipe F of the circulation passage D, but there remains a concern that the amount of heat may be insufficient, and the atmospheric temperature inside the humidifier 2 may not be able to be maintained at an appropriate value, even if the first flow control valve 8 is fully closed and all of the drain water flowing through the circulation passage D is supplied to the fourth heat exchanger 7.

However, even in this type of case, by including the eighth pipe M that provides a route for supplying the high-temperature steam flowing through the seventh pipe L to the humidifier 2, the above problem of insufficient heat can be resolved.

Figure 4:
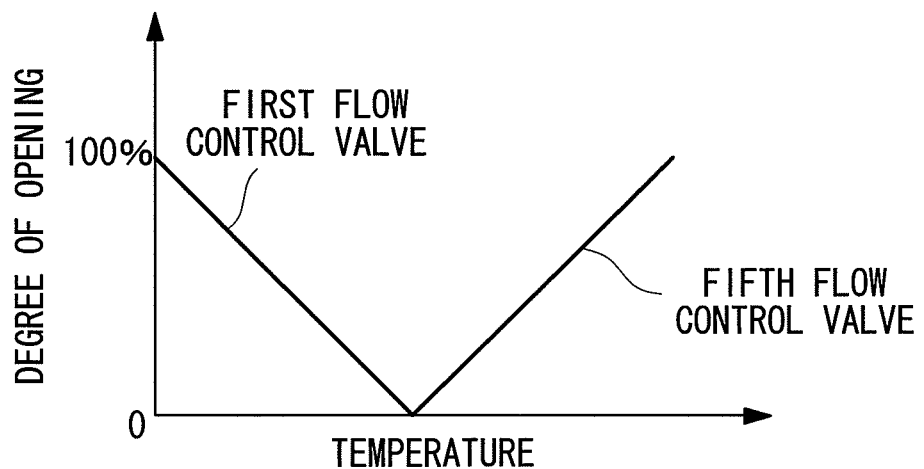
FIG. 4 A diagram illustrating control of the opening degree of the first flow control valve and the fifth flow control valve.

The degree of opening of the first flow control valve 8 and the degree of opening of the fifth flow control valve 23 are controlled, for example, in the manner illustrated in FIG. 4. Namely, in those cases where the humidifier 2 does not require much heat, the degree of opening of the first flow control valve 8 is adjusted with the fifth flow control valve 23 in a fully closed state. On the other hand, in those cases where the amount of heat is insufficient even when the first flow control valve 8 is fully closed and all of the drain water flowing through the circulation passage D is entering the fourth heat exchanger 7, the degree of opening of the fifth flow control valve 23 is adjusted, thereby supplying high-temperature steam from the eighth pipe M to the humidifier 2 and compensating for the lack of heat in the humidifier 2.

In this manner, because the hydrogen production apparatus 1 according to the present invention is provided with the circulation passage D, which cools the excess steam from the humidifier 2 and circulates the cooled steam as drain water, and the fourth heat exchanger 7 which uses the heat of the post-reaction process fluid to heat the drain water circulating within the circulation passage D, the steam used in the humidifier 2 can be supplied, as far as possible, from within the apparatus. In other words, it is only in those cases where, even if makeup water is supplied to the humidifier 2 from the sixth pipe I, high-temperature steam is supplied to the fifth pipe A' from the seventh pipe L, and high-temperature steam is supplied to the humidifier 2 from the eighth pipe M, there remains a concern that the amount of heat or the flow rate of steam may be insufficient, that high-pressure steam must be supplied through the steam supply pipe 6 from the combined power generation facility 105.

As a result, the amount of high-temperature steam supplied from the combined power generation facility 105 can be reduced, enabling a further improvement in the power generation efficiency.

Figure 5:
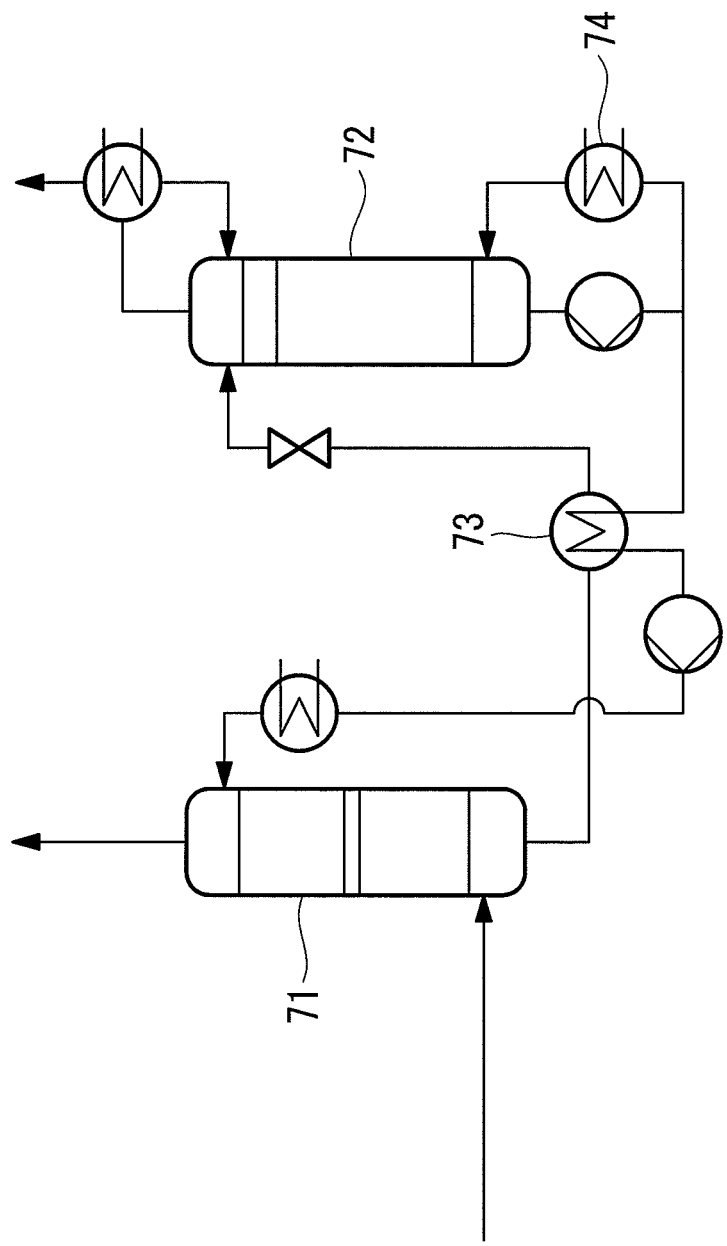
FIG. 5 A diagram describing applications of the steam produced in the hydrogen production apparatus.

The high-temperature steam produced in the hydrogen production apparatus 1 described above is used, for example, in a heat exchanger in the type of desulfurizer 103 illustrated in FIG. 5. For example, in the desulfurizer 103 having the type of structure illustrated in FIG. 5, the hydrogen-rich process fluid output through the first pipe A of the hydrogen production apparatus 1 is supplied to an $H_2S$ absorption tower 71 filled with an $H_2S$ absorbent. Following absorption of $H_2S$ in the $H_2S$ absorption tower 71, the absorbent is heated and gasified by heat exchange with a high-temperature steam in a heat exchanger 73, and is then supplied to an absorbent regeneration tower 72. In the absorbent regeneration tower 72, the $H_2S$ incorporated within the gas is removed, and following heat removal and liquefaction, the resulting fluid is returned to the $H_2S$ absorption tower 71. Further, within the circulation passage used for returning the fluid from the absorbent regeneration tower 72 to the $H_2S$ absorption tower 71 there is provided a heat exchanger 74 for reheating a portion of the fluid and returning it to the absorbent regeneration tower 72.

In this heat exchanger 74, the fluid discharged from the absorbent regeneration tower 72 is heated and re-gasified, and is then returned to the absorbent regeneration tower 72. In this manner, a plurality of heat exchangers 73 and 74 are provided within the desulfurizer 103, and these heat exchangers require a heat source for heating the fluid. In the power generation plant according to the present embodiment, the high-temperature steam produced in the hydrogen production apparatus 1 is supplied as a heat source for use by the heat exchangers of the desulfurizer 103. Accordingly, the use of the high-temperature steam used for power generation in the combined power generation facility 105 for applications other than power generation can either be prevented, or the amount of steam used can be reduced, enabling the power generation efficiency to be improved.

Figure 6:
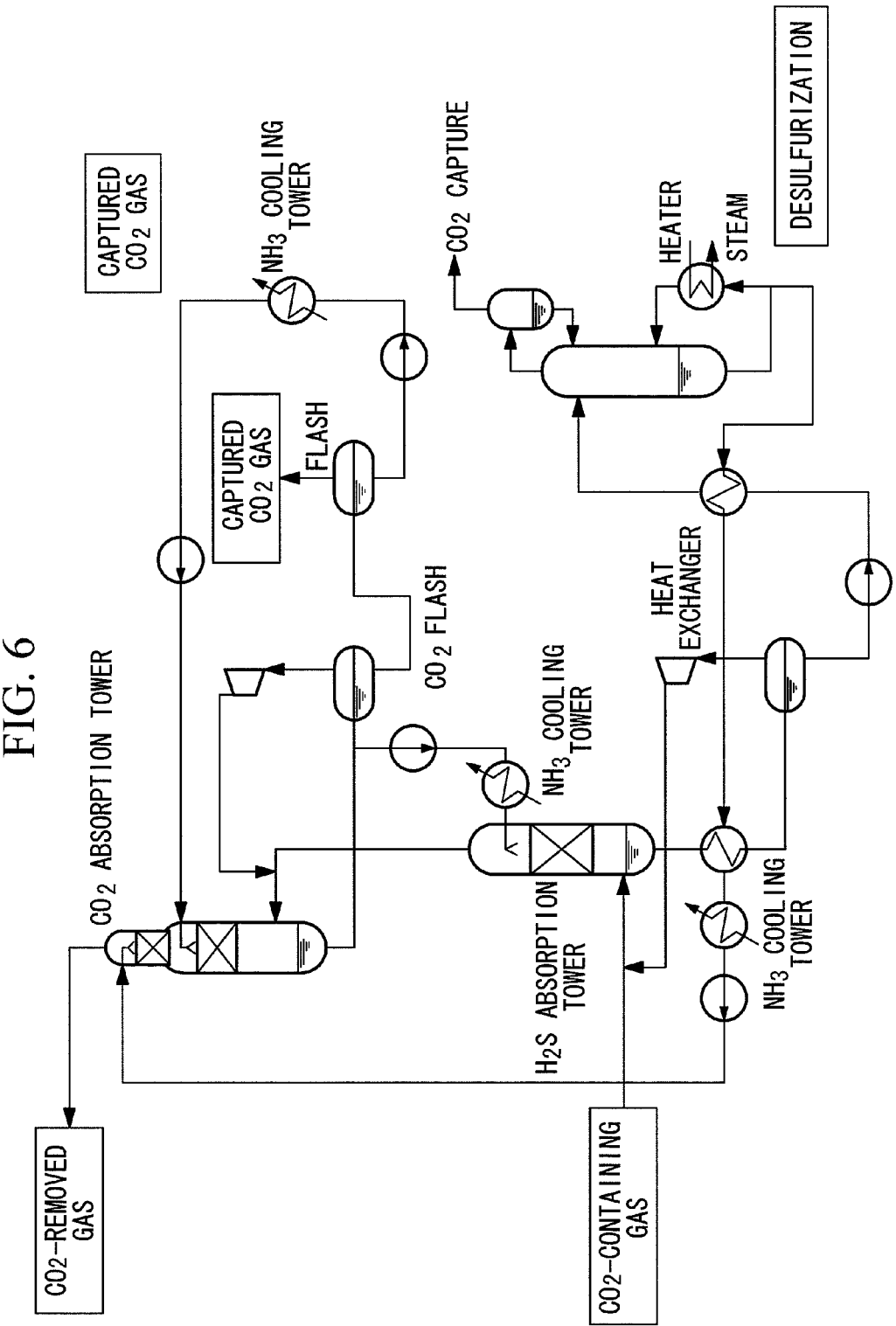
FIG. 6 A diagram describing applications of the steam produced in the hydrogen production apparatus.

FIG. 6 illustrates a structure in which desulfurization in the desulfurizer 103 and $CO_2$ capture in the carbon dioxide capture apparatus 104 are performed within a single system. In this system, in a similar manner to that described above, the desulfurizer is provided with a plurality of heat exchangers, and steam produced by the hydrogen production apparatus 1 can be used as the heat source for these heat exchangers.

MODIFIED EXAMPLE 1

Figure 7:
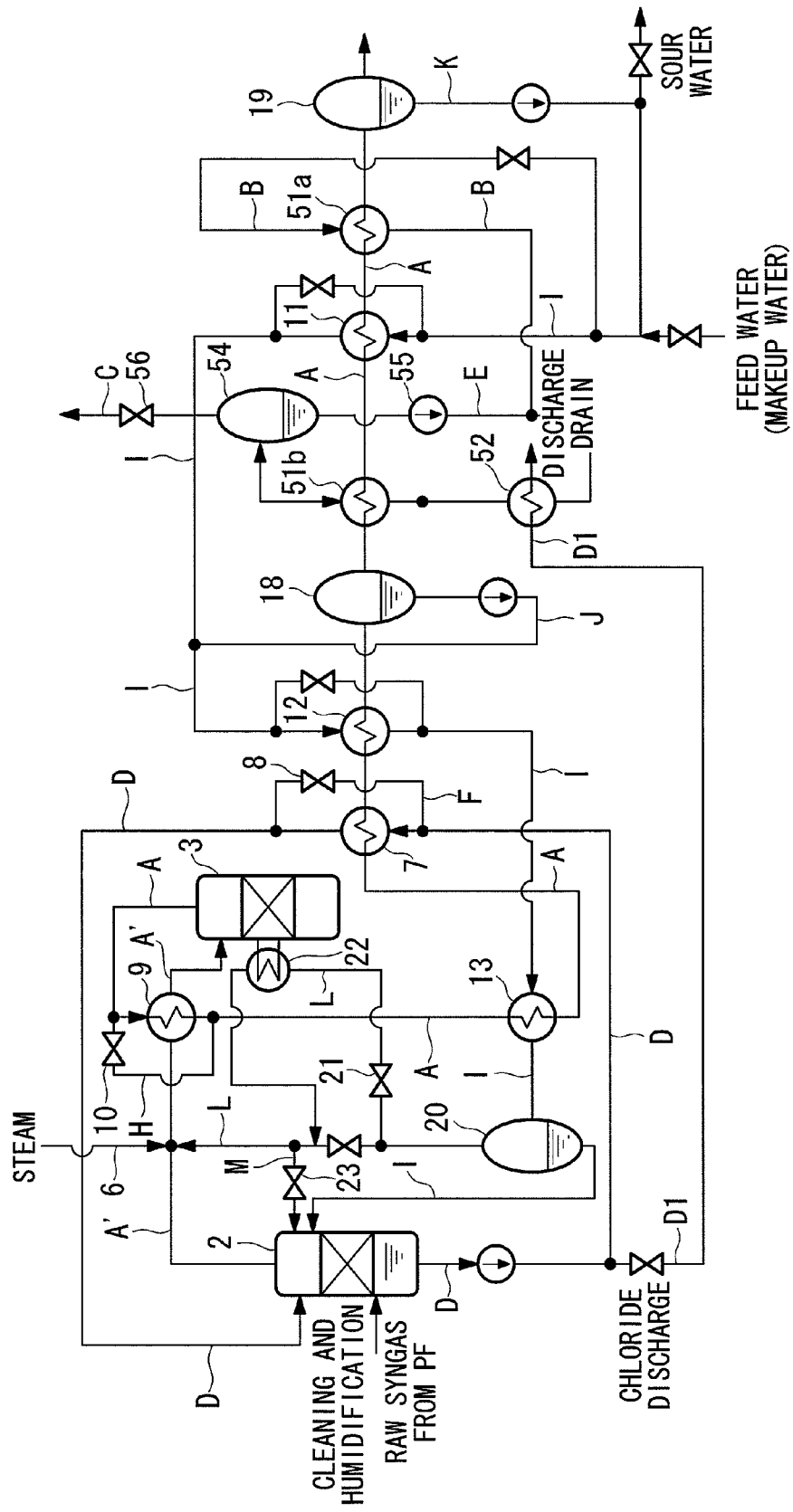
FIG. 7 A diagram schematically illustrating the structure of a hydrogen production apparatus according to a modified example 1 of the present invention.

In the first embodiment described above, makeup water was supplied from externally through the second pipe B, but in an alternative configuration, as illustrated in FIG. 7, makeup water may also be obtained from the sixth pipe I that supplies the makeup water used inside the hydrogen production apparatus. By adopting this configuration, the structure of the apparatus can be simplified.

MODIFIED EXAMPLE 2

In the first embodiment described above, a structure was described that included only a single reactor 3, but a plurality of reactors may be provided. In this case, the process fluid that has undergone reaction in the reactor located at the most upstream position is supplied sequentially to the reactor(s) located further downstream. By providing a plurality of reactors in this manner, the carbon monoxide content in the process fluid can be further reduced. Further, in this type of case where two or more reactors are provided, the reaction heat generated in each of the reactors may be subjected to heat exchange with different fluids.

Figure 8:
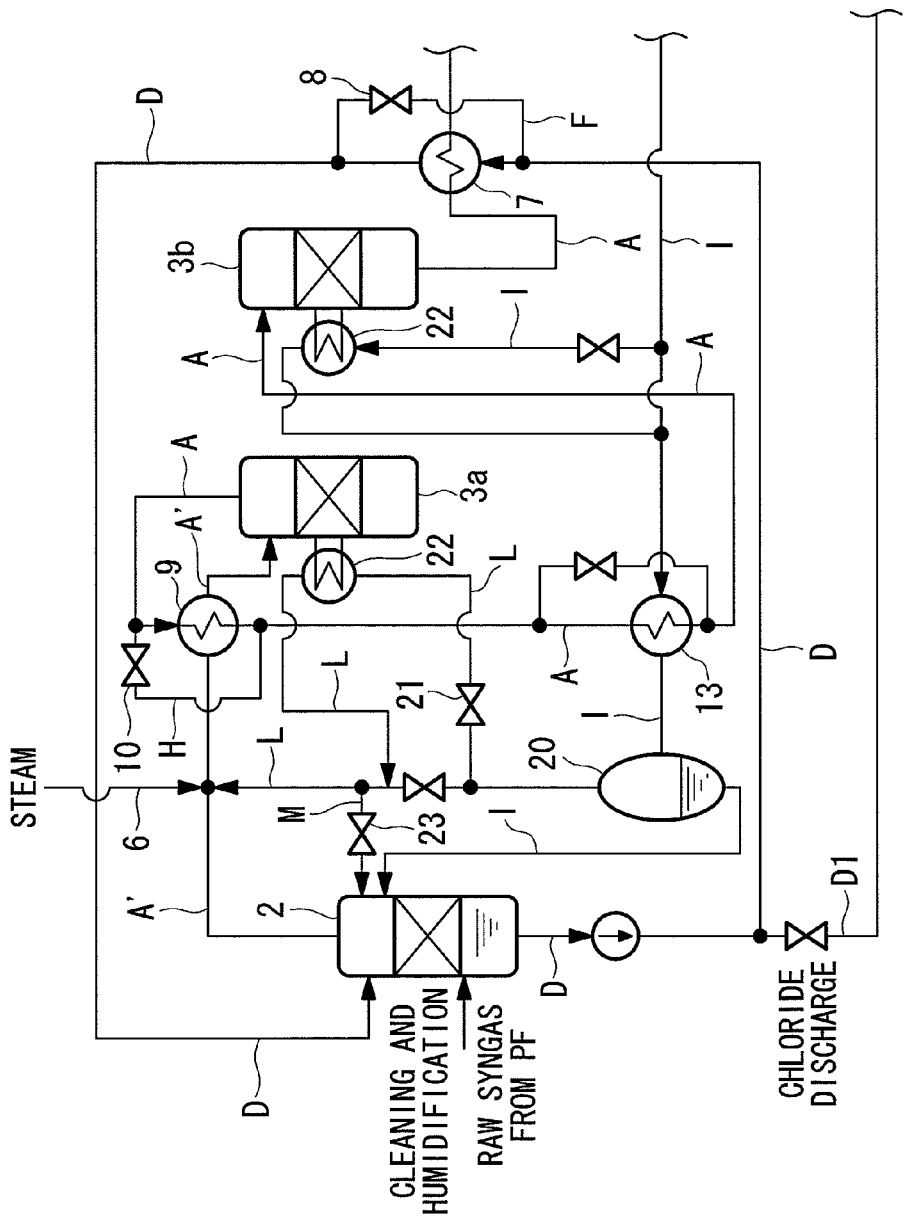
FIG. 8 A diagram schematically illustrating the structure of a hydrogen production apparatus according to a modified example 2 of the present invention.

FIG. 8 illustrates a structure provided with two reactors 3a and 3b. In FIG. 8, the reaction heat from the reactor 3a positioned on the upstream side undergoes heat exchange with the steam flowing through the seventh pipe L, whereas the reaction heat from the reactor 3b positioned on the downstream side undergoes heat exchange with the makeup water flowing through the sixth pipe I.

MODIFIED EXAMPLE 3

Figure 9:
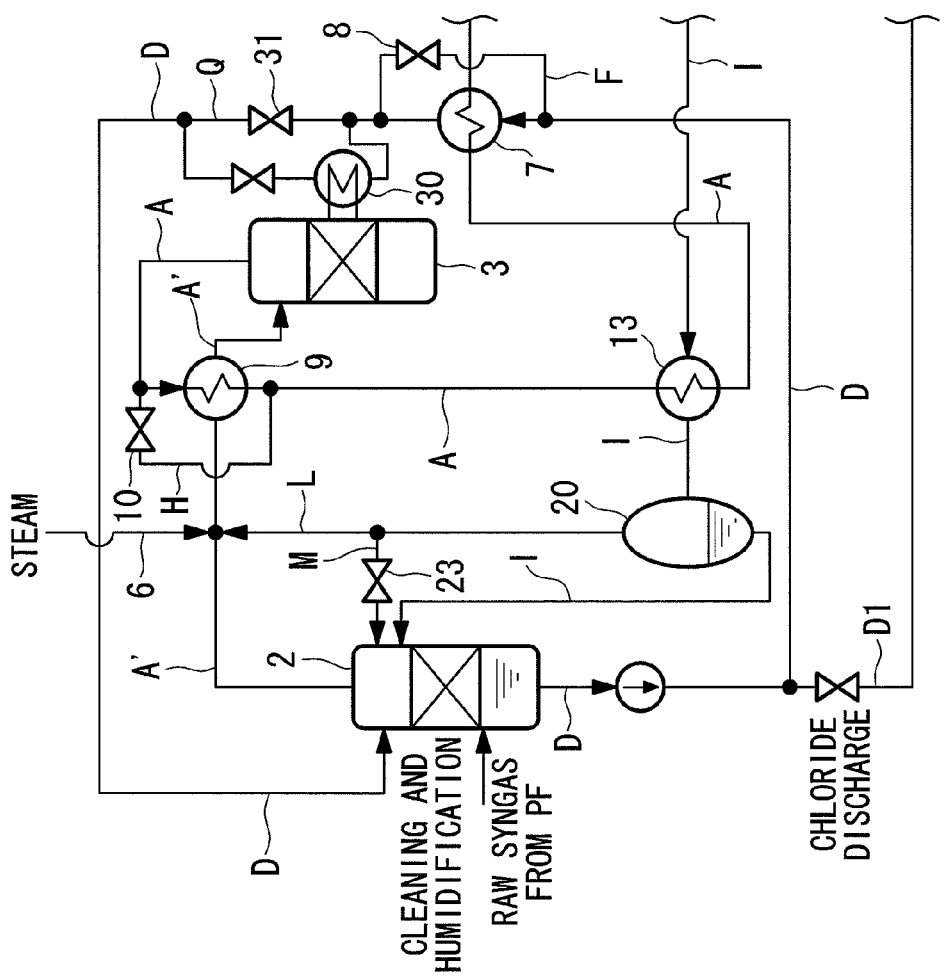
FIG. 9 A diagram schematically illustrating the structure of a hydrogen production apparatus according to a modified example 3 of the present invention.

In the first embodiment described above, the reaction heat from the reactor 3 was subjected to heat exchange with the steam flowing through the seventh pipe L, thereby suppressing temperature increase inside the reactor 3, but in an alternative structure, the heat from the reactor 3 may be subjected to heat exchange with the drain water flowing through the circulation passage D to suppress temperature increase inside the reactor 3. FIG. 9 illustrates a structure in which heat exchange is performed between the heat from the reactor 3 and the drain water flowing through the circulation passage D. This heat exchange between the heat from the reactor 3 and the drain water flowing through the circulation passage D is performed in a seventh heat exchanger 30. Further, a third bypass pipe Q that bypasses the seventh heat exchanger 30 may be provided within the circulation passage D, and a sixth flow control valve 31 for controlling the flow rate of the drain water supplied to the seventh heat exchanger 30 may be provided within the third bypass pipe Q. As a result, the temperature inside the reactor 3 can be maintained at an appropriate value for the reaction.

The method for consuming the reaction heat generated in the reactor 3 is not limited to heat exchange with the drain water as described above. For example, heat exchange may also be performed with the makeup water flowing through the sixth pipe I.

Second Embodiment

Figure 10:
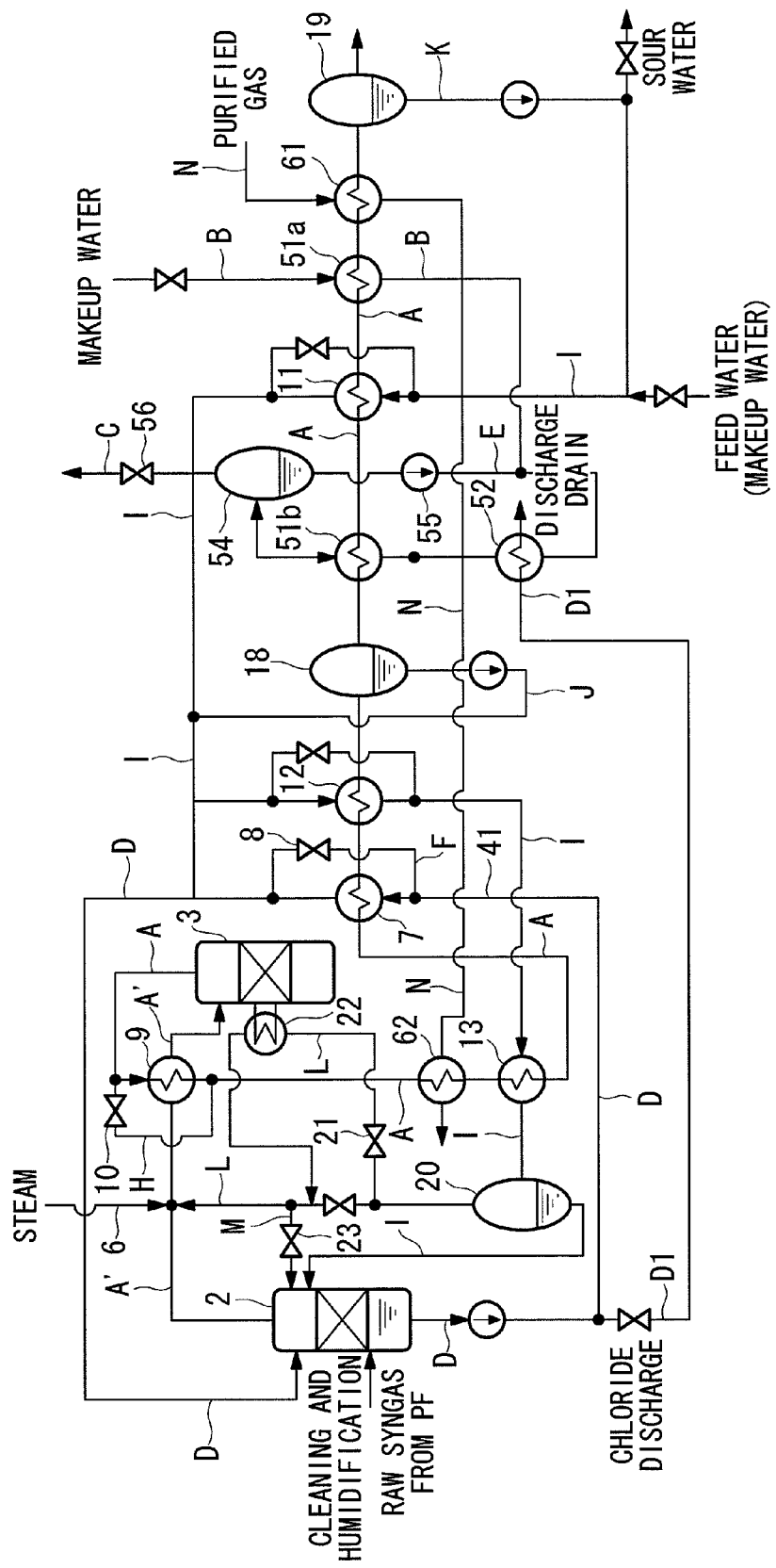
FIG. 10 A diagram schematically illustrating the structure of a hydrogen production apparatus according to a second embodiment of the present invention.

Next is a description of a second embodiment of the present invention with reference to FIG. 10.

The point of difference between the hydrogen production apparatus of this embodiment and the apparatus of the first embodiment is that, in the present embodiment, the purified gas produced in the carbon dioxide capture apparatus 104 illustrated in FIG. 1 is subjected to heat exchange with the high-temperature process fluid flowing through the first pipe A, thereby heating the purified gas, and the apparatus is further provided with a purified gas pipe N for supplying this heated purified gas to the combined power generation facility 105 (see FIG. 1).

In FIG. 10, the purified gas pipe N through which the purified gas flows crosses the first pipe A at a location between the gas-liquid separator 19 and the first heat exchanger 51a, and then again at a location between the fifth heat exchanger 9 and the heat exchanger 13. Heat exchangers 61 and 62 respectively are provided at these crossing locations, and heat exchange between the high-temperature process fluid flowing through the first pipe A and the purified gas flowing through the purified gas pipe N is performed within these two heat exchangers 61 and 62. The purified gas is heated by this heat exchange, and the resulting purified gas, which has been heated to a temperature of approximately 300° C., is fed to the combined power generation facility 105 (see FIG. 1), for example to a combustor provided upstream from the gas turbine.

In this manner, by providing the heat exchangers 61 and 62 that perform heat exchange with a gas that has been produced in an apparatus positioned downstream from the hydrogen production apparatus, the heat generated in the reactor 3 can be used even more efficiently.

There are no particular limitations on the locations of the heat exchangers 61 and 62, or on the number of heat exchangers provided, provided that a predetermined amount of heat can be maintained within the process fluid itself flowing through the first pipe A. For example, the heat exchanger 61 may be provided at a location on the first pipe A between the first heat exchanger 51b and the heat exchanger 11, or at a location between the heat exchanger 11 and the first heat exchanger 51a.

The structures according to the modified examples 1 to 3 described above and the structure according to the second embodiment may be combined as appropriate in accordance with design requirements and the like.

REFERENCE SIGNS LIST

1 Hydrogen production apparatus
2 Humidifier
3 Reactor
51a, 51b First heat exchanger
54 Gas-liquid separator
101 Gasifier
103 Desulfurizer
104 Carbon dioxide capture apparatus
105 Combined power generation facility
A First pipe
B Second pipe
C Third pipe
D Circulation passage
D1 Discharge passage
E Fourth pipe
N Purified gas pipe

The invention claimed is:

1. A hydrogen production apparatus, which is provided in a power generation plant comprising a boiler and a steam turbine that is driven by a high-temperature steam produced in the boiler, and which produces steam for supply to other apparatus within the power generation plant, the hydrogen production apparatus comprising:
   a humidifier, which is supplied with a process fluid containing carbon monoxide, wherein the humidifier is operable to mix the process fluid with a steam;
   a reactor, which reacts a humidified process fluid output from the humidifier in presence of a catalyst, thereby converting the carbon monoxide within the process fluid into carbon dioxide;
   a first pipe through which a high-temperature process fluid flows following reaction in the reactor;
   a second pipe for supplying a makeup water;
   at least one first heat exchanger disposed at one location of one or more locations where the first pipe and the second pipe cross each other; and
   a third pipe for supplying steam generated by heat exchange in the first heat exchanger to another apparatus;
   a discharge passage through which a portion of excess moisture within the humidifier is released externally;
   a second heat exchanger provided at a location where the second pipe and the discharge passage cross each other; and
   a gas-liquid separator that is supplied with makeup water that has completed heat exchange within the first heat exchanger and the second heat exchanger,
   wherein the third pipe is connected to a gas phase portion of the gas-liquid separator, and steam separated by the gas-liquid separator is supplied to the other apparatus.

2. The hydrogen production apparatus according to claim 1, further comprising:
   a fourth pipe for circulating drain water from a liquid phase portion of the gas-liquid separator, wherein
   the fourth pipe is connected to the second pipe.

3. A power generation plant, comprising the hydrogen production apparatus according to claim 1.

4. A power generation plant, comprising:
   a gasifier for gasifying coal and producing a coal gas,
   the hydrogen production apparatus according to claim 1, which is supplied with the coal gas from the gasifier and producing a hydrogen-rich coal gas, a purified gas production apparatus for removing hydrogen sulfide and carbon dioxide from the hydrogen-rich coal gas output from the hydrogen production apparatus, and producing a purified gas, a combined power generation facility comprising a gas turbine and a steam turbine, and a purified gas pipe for supplying the purified gas produced by the purified gas production apparatus to the combined power generation facility, wherein the purified gas pipe crosses the first pipe of the hydrogen production apparatus at one or more locations, a heat exchanger is disposed at each crossing location, and the purified gas, having undergone at least one heat exchange with a high-temperature process fluid flowing through the first pipe, is supplied to the combined power generation facility through the purified gas pipe.

* * * * *